Figure 1:
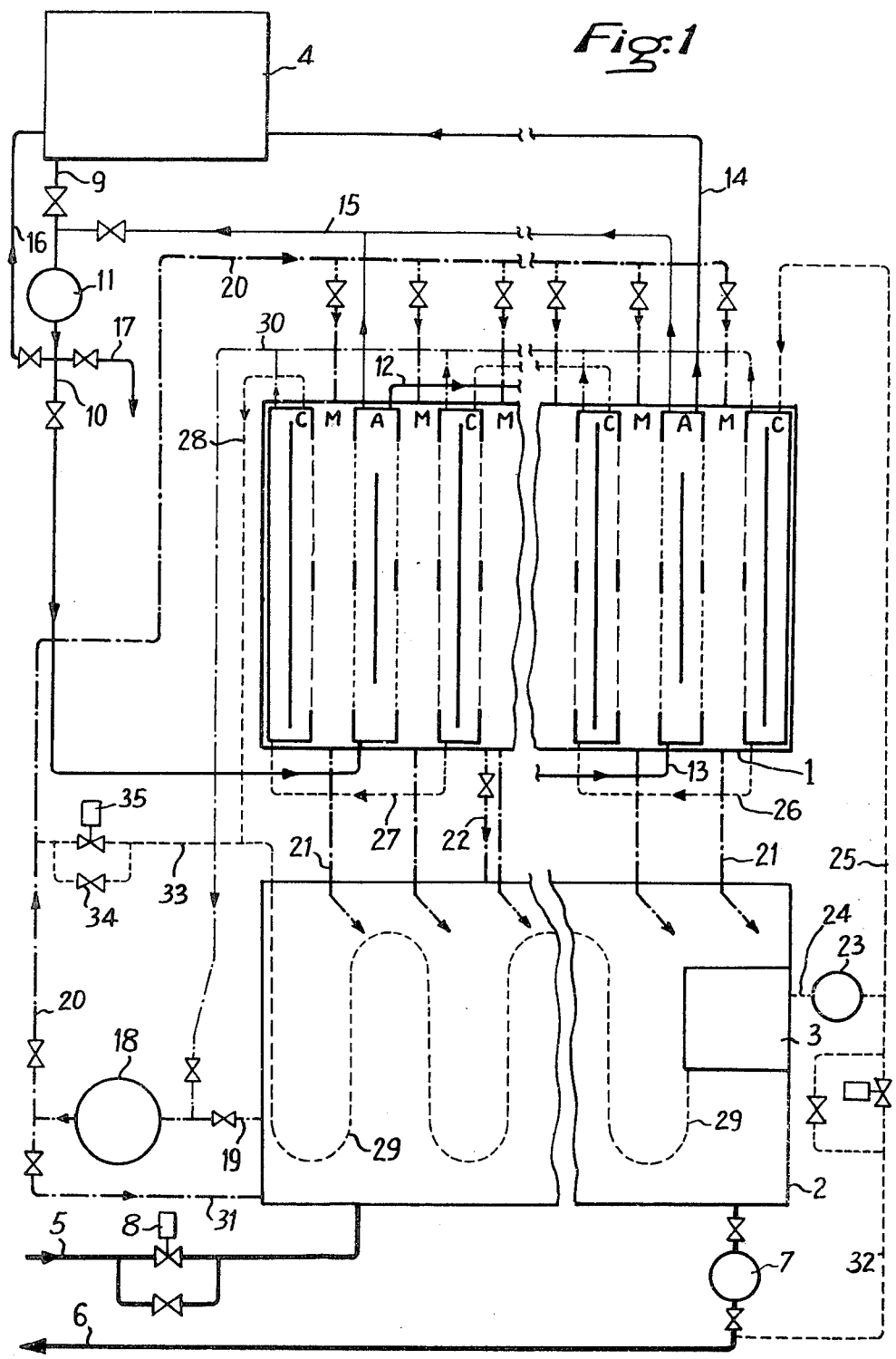

United States Patent [19]

Nicou et al.

[11] 4,071,431
[45] Jan. 31, 1978

[54] INSTALLATION FOR THE TREATMENT OF METALS PICKLING SOLUTIONS

[75] Inventors: Oliver Nicou, Chatillon-sur-Bagneux; Roger Lumbroso, Paris, both of France

[73] Assignee: Socomaten, Clamart, France

[21] Appl. No.: 697,464

[22] Filed: June 18, 1976

[30] Foreign Application Priority Data

June 18, 1975 France .............................. 75 19081

[51] Int. Cl.² ........................ B01D 13/02; C25C 1/06
[52] U.S. Cl. .................................... 204/301; 204/130; 204/151; 204/180 P; 204/262
[58] Field of Search .................... 204/180 P, 301, 262, 204/130, 151

[56] References Cited

U.S. PATENT DOCUMENTS

| | | | |
|---|---|---|---|
| 2,422,468 | 6/1947 | Chambers et al. | 204/262 X |
| 2,578,839 | 12/1951 | Renzoni | 204/263 |
| 3,481,851 | 12/1969 | Lancy | 204/301 X |
| 3,488,276 | 1/1970 | Tarsey | 204/301 |
| 3,657,105 | 4/1972 | Veld | 204/301 |
| 3,764,501 | 10/1973 | Lancy et al. | 204/301 X |

*Primary Examiner*—Arthur C. Prescott
*Attorney, Agent, or Firm*—Darby & Darby

[57] ABSTRACT

An installation for the treatment of metals pickling solutions is disclosed. The invention provides for solutions to be treated by electrodialysis in a tank which is divided up to form sets of three compartments. Anode and cathode compartments in the form of removable cases are arranged alternately with spaces therebetween defining central compartments. In use, according to a preferred method of the invention, anolyte flows through the anode compartments while the pickling solution flows through the cathode and central compartments. Flow through the compartments may be either in series or in parallel.

10 Claims, 2 Drawing Figures

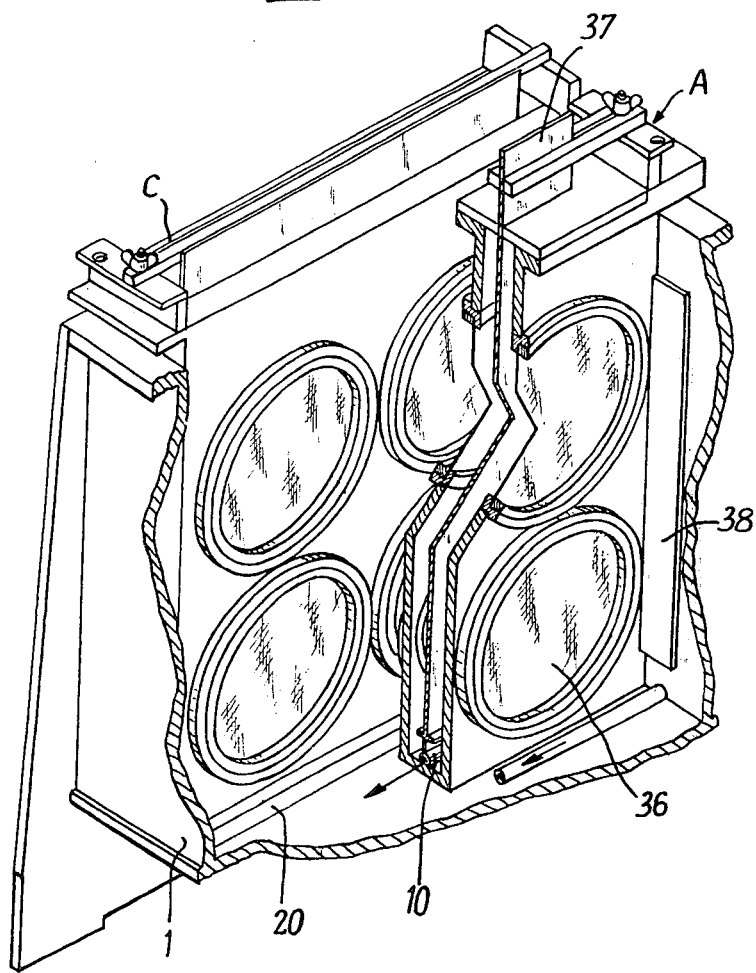

INSTALLATION FOR THE TREATMENT OF METALS PICKLING SOLUTIONS

The present invention concerns a method and an installation for the treatment of metals pickling solutions.

Pickling solutions, for example hydrochloric acid solutions for the pickling of ferrous metals, have to be treated before being disposed of. They can be neutralised with lime, and the iron can be precipitated in hydroxide form. This technique does not allow any recovery of the hydrochloric acid and produces considerable quantities of slurries. They can be treated by an ion exchange process, allowing a certain recovery of free hydrochloric acid. The iron fixed on the ion exchange resin is precipitated after elution. Finally, it is known to treat an iron-pickling hydrochloric solution in an electrodialysis tank divided into three compartments by two ion exchange membranes. The external compartments receive in the one case an anode, and in the other a cathode.

The solution to be treated is introduced into the cathode compartment where the iron is removed, and into the central compartment where the hydrochloric acid is concentrated.

One of the objects of the invention is the provision of a method for the continuous treatment of acid solutions for the pickling of metals. A further object of the invention is the construction of an installation for the treatment of pickling solutions whereby metal can be recovered.

The present invention provides an installation for the treatment of solutions used for pickling metals, characterised in that it comprises a treatment tank comprising a plurality of alternately anode and cathode compartments, separated into twos by central compartments, the divisions between two adjacent compartments being effected by ion exchange membranes.

According to another feature of the present invention, the anode and cathode compartments are constituted in the form of detachable cases whose lateral walls carry the ion exchange membranes.

The invention also relates to a method for the treatment of metals pickling solutions, using the aforesaid installation, characterised in that a portion of the pickling solution being treated flows through the cathode compartments, the remainder of the solution flowing through the central compartments.

Other features of the invention will be brought out from the following description given with reference to the accompanying drawings wherein:

FIG. 1 shows a general diagrammatic view of the installation according to the invention, and FIG. 2 shows a perspective view, partly broken away, of a pant of the treatment tank showing details of the compartments.

Referring now to the drawings, it will be seen that the treatment tank 1 contains a plurality of anode compartments A and cathode compartments C each pair of which is separated by central compartments M. The compartments A and C are constituted by detachable cases, and the compartments M are constituted by the space remaining in the tank 1 between two neighbouring cases.

The installation also comprises an intermediate tank 2, a catholyte tank 3, and an anolyte tank 4.

The intermediate tank 2 is connected by way of the conduits 5 and 6 and the pump 7 to the pickling tank, which is not shown. These conduits are provided with shutoff valves and an electromagnetic valve 8.

Through the agency of the conduits 9 and 10 the pump 11 sends the anolyte into the first compartment A, whence it flows out by overflow into the second compartment, through conduit 12 and so on to the last compartment by way of the conduit 13.

The overflow from the last compartment A flows by way of the conduit 14 into the anolyte tank 4. This tank is arranged so that it can receive supplementary additions of anolyte and more especially of water, by means not shown in the drawings.

Furthermore, all the compartments A may be emptied into the tank 4 by means of the pump 11, by way of conduits 15 and 16.

Provision is also made for emptying the tank 4 by means of the pump 11, by way of conduits 9 and 17. All these conduits are provided with valves to ensure correct flow of anolyte during these various operations.

By way of the conduits 19 and 20 the pump 18 supplies the central compartments M from the intermediate tank 2. All the compartments M are supplied in parallel, and discharge by overflow into the intermediate tank by way of conduits 21. Also, an emptying conduit 22 is provided between the tank 1 and the intermediate tank 2.

The cathode compartments C are supplied with catholyte by the pump 23 by way of conduits 24 and 25, the latter opening into the first compartment C. The latter discharges by overflow into the second compartment C by means of the conduit 26 and so on to the last compartment, which is supplied by the conduit 27.

The conduit 28 allows outflow of the overflow from the last compartment C into a pipe coil 29 which extends through the intermediate tank 2 and opens into the catholyte tank 3.

All the compartments C can be emptied into the intermediate tank 2 by means of the pump 18 by way of the conduits 30 and 31.

The pump 23 also allows the catholyte tank to be emptied into the pickling tank by way of conduits 32 and 6. On the other hand the pump 18 makes it possible to supply the tank 3 from the intermediate tank 2 by way of conduits 19, 20 and 33. All these conduits are controlled by valves such as 34 or electromagnetic valves such as 35.

In the installation provided by the present invention, a distinction may be made between various kinds of fluid circuits. First of all the anolyte circuit, which is independent, and connects all the compartments A in series and/or in parallel and the anolyte tank 4. Then, the catholyte circuit, of the same type as the previous circuit, which connects all the compartments C in series and/or in parallel and the catholyte tank 3. Finally, the circuit of the central compartments which are all supplied in parallel from the intermediate tank 2. Besides these main circuits there are the emptying circuits for the three types of compartments, the circuit connecting the intermediate tank to the pickling tank, and more especially the communication circuit between the intermediate tank 2 and the catholyte tank 3, comprising the conduit 33 controlled by the valve 34 and the electromagnetic valve 35.

The operation of the installation has been described as a sequential operation. However, the electromagnetic valves and the pumps are preferably subject to control in accordance with the variations of the electrical current passing between anodes and cathodes, so as to make this operation semi-continuous or continuous, the opening and closing of the electromagnetic valves being controlled by two predetermined intensity thresholds.

According to one feature of the invention, the flow of the pickling solution in the central compartments is relatively rapid so as to provide a cooling function for the treatment tank. More particularly it is faster than that of the anolyte or catholyte.

Incidentally the catholyte flows through a pipe coil 29 in the intermediate tank so as ensure that it is cooled.

In FIG. 2 the tank 1 and the compartments A and C are made of moulded plastics material, or material covered with plastics material. The anode compartment A is constituted by a sealing-tight case accommodated in the tank 1, and whose side walls are provided with ion exchange membranes 36. These membranes are preferably fixed in mounting devices such as those described in French Pat. No. 69 40,350. The anode proper 37 is arranged in the central plane of the compartment A. The anolyte supply conduit 10 is arranged at the bottom of the compartment. It is constituted by a tube perforated with holes to allow the uniform distribution of the anolyte over the entire length of the compartment. The overflow discharge conduit 12 is not shown, likewise the emptying conduit 15.

The cathode compartment C is constituted substantially in the same manner. These compartments are guided, when put in place, by spacers 38 provided at the sides of the tank 1. The space between two adjacent compartments A and C forms a central compartment M. The supply conduit 20 of this compartment is also a perforated tube situated at the bottom of the tank. The overflow discharge is also not shown.

In the installation according to the present invention the number of compartments, and their dimensions, are determined by the performance levels which are to be achieved, that is to say the quantity of metal to be extracted from the pickling solution. The materials used for the cathode and anode are also selected in accordance with the type of the metal to be extracted and the pickling solution.

The invention applies to the treatment of solutions for the pickling of metals and allows the recovery of the metals present in the solutions without impoverishing the qualities of the solutions themselves.

We claim:

1. An installation for treatment of solutions used for pickling metals which comprises:
    a treatment tank,
    a plurality of sealed cases comprising anode compartments suspended in said tank, each of said anode compartments comprising a pair of longitudinal side walls extending into said tank and containing an electrical anode, at least one ion exchange membrane mounted on each of said side walls, each of said anode compartments being removable from said tank,
    a plurality of sealed cases comprising cathode compartments suspended in said tank and spaced apart from said anode compartments, each of said cathode compartments comprising a pair of longitudinal side walls extending into said tank and containing an electrical cathode, at least one ion exchange membrane mounted on each of said side walls, said cathode compartments being removable from said tank, and
    a plurality of central compartments within said tank, each of said central compartments being defined by one side wall of an anode compartment and one side wall of a cathode compartment.

2. An installation according to claim 1 further comprising a metal anode suspended within each of said sealed anode compartments, said anode being arranged in the central plane of said anode compartment.

3. An installation according to claim 1, including an intermediate tank, an anolyte tank and a catholyte tank.

4. An installation according to claim 3, including conduit means for returning catholyte to the catholyte tank collected from each of said cathode compartments, including a tube coil arranged in the intermediate tank.

5. An installation according to claim 3, which comprises tubes pierced with distribution orifices and arranged at the bottom and over the entire length of the anode, cathode and central compartments.

6. An installation according to claim 5 which comprises means for supplying fluid from the intermediate tank to the central compratments in parallel, the installation further including means for directing overflow from the central compartments back into said intermediate tank.

7. An installation according to claim 5 which comprises means for supplying the anode compartments in series including an overflow pipe from each anode compartment connected to the bottom of the succeeding anode compartment.

8. An installation according to claim 5 which comprises means for supplying the cathode compartments in series including an overflow pipe from each cathode compartment connected to the bottom of the succeeding cathode compartment.

9. An installation according to claim 5 which comprises means for interconnecting the anode compartments in parallel with said anolyte tank.

10. An installation according to claim 5 which comprises means for supplying the cathode compartments in parallel with said catholyte tank.

* * * * *